(12) United States Patent
Merchant et al.

(10) Patent No.: US 9,702,327 B2
(45) Date of Patent: Jul. 11, 2017

(54) SYSTEM AND METHOD FOR INTRODUCING GAS INTO ENGINE CYLINDER

(71) Applicant: Caterpillar Inc., Peoria, IL (US)

(72) Inventors: Jack A. Merchant, West Lafayette, IN (US); Keith A. IntVeld, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 175 days.

(21) Appl. No.: 14/614,803

(22) Filed: Feb. 5, 2015

(65) Prior Publication Data
US 2016/0230730 A1 Aug. 11, 2016

(51) Int. Cl.
| F02M 61/14 | (2006.01) |
| F02M 35/10 | (2006.01) |
| F02M 61/18 | (2006.01) |
| F02M 21/02 | (2006.01) |

(52) U.S. Cl.
CPC ...... *F02M 61/145* (2013.01); *F02M 21/0278* (2013.01); *F02M 35/10216* (2013.01); *F02M 61/18* (2013.01); *F02M 21/0209* (2013.01); *F02M 21/0281* (2013.01); *Y02T 10/32* (2013.01)

(58) Field of Classification Search
CPC .. F02M 61/145; F02M 61/18; F02M 21/0278; F02M 21/0281; F02M 21/0209; F02M 35/10216
USPC ................ 123/299, 305, 525, 470
See application file for complete search history.

(56) References Cited

U.S. PATENT DOCUMENTS

| 3,182,646 | A | * | 5/1965 | Kuechenmeister .. | F02M 69/044 123/533 |
| 5,150,691 | A | * | 9/1992 | Imajo ............... | F02F 1/4214 123/308 |
| 5,377,646 | A | | 1/1995 | Chasteen | |
| 5,526,797 | A | * | 6/1996 | Stokes ............ | F02D 15/04 123/525 |
| 5,546,908 | A | * | 8/1996 | Stokes ............ | F02D 15/04 123/480 |
| 5,592,924 | A | * | 1/1997 | Audisio .......... | F02B 69/04 123/525 |
| 5,666,926 | A | * | 9/1997 | Ferrera .......... | F02B 43/00 123/27 GE |
| 5,673,673 | A | * | 10/1997 | Beck .............. | F02D 19/10 123/527 |

(Continued)

FOREIGN PATENT DOCUMENTS

| EP | 1820951 A1 | 2/2007 |
| WO | WO 98/59165 A1 | 12/1998 |
| WO | WO 2014/060006 A1 | 4/2014 |

*Primary Examiner* — Hai Huynh
(74) *Attorney, Agent, or Firm* — Leydig, Voit & Mayer, LTD.

(57) ABSTRACT

An internal combustion engine includes a cylinder receiving air during operation through an intake air fluid passage, an engine component that at least partially forms a section of the intake air fluid passage, and a gas diffuser having a tip disposed within the intake air fluid passage. A gas injector housing is connected to the body portion of the gas diffuser. The gas diffuser is structurally interchangeable with other gas diffusers such that gas dispersion in various engine applications can be modified by installing an appropriate gas diffuser and otherwise maintaining common engine parts.

5 Claims, 4 Drawing Sheets

(56) References Cited

U.S. PATENT DOCUMENTS

| | | | | |
|---|---|---|---|---|
| 5,713,336 | A * | 2/1998 | King | F02B 69/00 |
| | | | | 123/525 |
| 6,163,406 | A * | 12/2000 | Morton | G02B 3/005 |
| | | | | 359/619 |
| 6,440,200 | B1 * | 8/2002 | Sakakibara | B01D 46/0023 |
| | | | | 123/519 |
| 6,588,406 | B2 * | 7/2003 | Oprea | F02D 19/0647 |
| | | | | 123/304 |
| 6,609,499 | B2 * | 8/2003 | Kabat | F02B 43/00 |
| | | | | 123/432 |
| 7,284,542 | B2 | 10/2007 | Wright | |
| 8,757,133 | B2 | 6/2014 | Czapka et al. | |
| 9,038,599 | B2 * | 5/2015 | Matsukawa | F02M 55/025 |
| | | | | 123/456 |
| 2010/0300407 | A1 * | 12/2010 | Ravenhill | F02M 35/10032 |
| | | | | 123/468 |
| 2016/0230706 | A1 * | 8/2016 | Schwark | F02M 21/0278 |
| 2016/0258396 | A1 * | 9/2016 | Nishimura | B63H 21/38 |

\* cited by examiner

SYSTEM AND METHOD FOR INTRODUCING GAS INTO ENGINE CYLINDER

TECHNICAL FIELD

This patent disclosure relates generally to internal combustion engines and, more particularly, to engines configured to operate with a gaseous fuel.

BACKGROUND

Single- or dual-fuel engines that use a gaseous fuel are known and used for various applications, such as generator sets, engine-driven compressors, engine driven pumps, machines, on- and off-highway trucks, and others. The operation of such engines by substitution of a certain amount of heavy fuel, such as diesel, with a lighter fuel, such as natural gas, biogas, liquid petroleum gas (LPG) or other types of fuel that may be more readily available and cost effective, makes them more effective to operate. In some applications, the gas engines may be operating entirely on the gaseous fuel.

Unlike liquid fuels such as gasoline or diesel, which are provided to the engine at a high pressure and are typically directly injected into the engine cylinders for modern engines, gaseous fuels can be provided to the engine at relatively lower pressures and are injected or fumigated into an air stream that is provided to the engine cylinder(s). For controlling engine emissions and power, it is important to provide the engine cylinders with a relatively homogeneous fuel/air mixture, which requires sufficient time for the fuel to mix with the air after injection. However, the engine response to fuelling changes, for example, during transient engine operation, is improved if the time available for fuel/air mixing is reduced. Moreover, different engine applications having common intake air hardware but different operating flows and fueling rates cannot exploit the same gas diffusion structures.

In a previously proposed method of improving mixing of a gaseous fuel in an engine intake air stream as shown, for example, in WO 1998/059165 A1 ("Zilocchi"), it was proposed to include a structure in which the air/fuel ratio for various engines may be adjusted using the same structure. In Zilocchi, the adjustment of the air/fuel ratio is accomplished by adjusting the relative position and/or orientation of moveable and cooperating components presenting different gas and air flow areas. However, systems such as Zilocchi's are only partially effective in addressing variability between different engine applications and may also increase pressure drop for air and gas being provided to the engine, this increasing pumping losses of the engine and decreasing efficiency.

SUMMARY

The disclosure describes, in one aspect, an internal combustion engine. The internal combustion engine includes a combustion cylinder defined at least partially within a cylinder block and configured to receive air during operation through an intake air fluid passage. The internal combustion engine further includes an engine component at least partially forms a section of the intake air fluid passage, and a gas diffuser that includes a body portion and a gas injector portion. The body portion is connected to a mounting flange formed on the engine component. The gas injector portion extends through a bore formed in the engine component such that a tip of the gas injector portion is disposed within the intake air fluid passage. The gas diffuser forms a gas injection passage, which extends through the body portion and the gas injector portion, and at least one gas injection orifice, which fluidly connects the gas injection passage with the intake air fluid passage. A gas injector housing is connected to the body portion of the gas diffuser and has a gas outlet that is fluidly connected to the gas injection passage.

In another aspect, the disclosure describes a method for assembling a first engine and a second engine. The method includes, in no particular order, providing a first piece and a second piece of an engine component that forms at least a portion of a fluid passage that carries intake air to one or more engine cylinders, assembling the first piece of the engine component onto the first engine, assembling the second piece of the engine component onto the second engine, connecting a first gas diffuser having a first gas injection pattern onto the first piece of the engine component on the first engine, connecting a second gas diffuser having a second gas injection pattern onto the second piece of the engine component on the second engine, providing a first piece and a second piece of a gas valve housing, connecting the first piece of the gas valve housing to the first gas diffuser on the first engine, and connecting the second piece of the gas valve housing to the second gas diffuser on the second engine.

In yet another aspect, the disclosure describes a method for using common engine parts in first and second different engines having different gas dispersion requirements. The method includes providing an engine component forming at least a portion of an intake air passage for each of the first and second different engines, providing first and second gas diffuser components that are structurally interchangeable but include different gas spray patterns, and assembling the first and second engines by connecting the first gas diffuser to the first engine and the second gas diffuser to the second engine.

In a further aspect, the disclosure describes an internal combustion engine that includes a cylinder receiving air during operation through an intake air fluid passage, an engine component that at least partially forms a section of the intake air fluid passage, and a gas diffuser having a tip disposed within the intake air fluid passage. A gas injector housing is connected to the body portion of the gas diffuser. The gas diffuser is structurally interchangeable with other gas diffusers such that gas dispersion in various engine applications can be modified by installing an appropriate gas diffuser and otherwise maintaining common engine parts.

DETAILED DESCRIPTION

Figure 1:
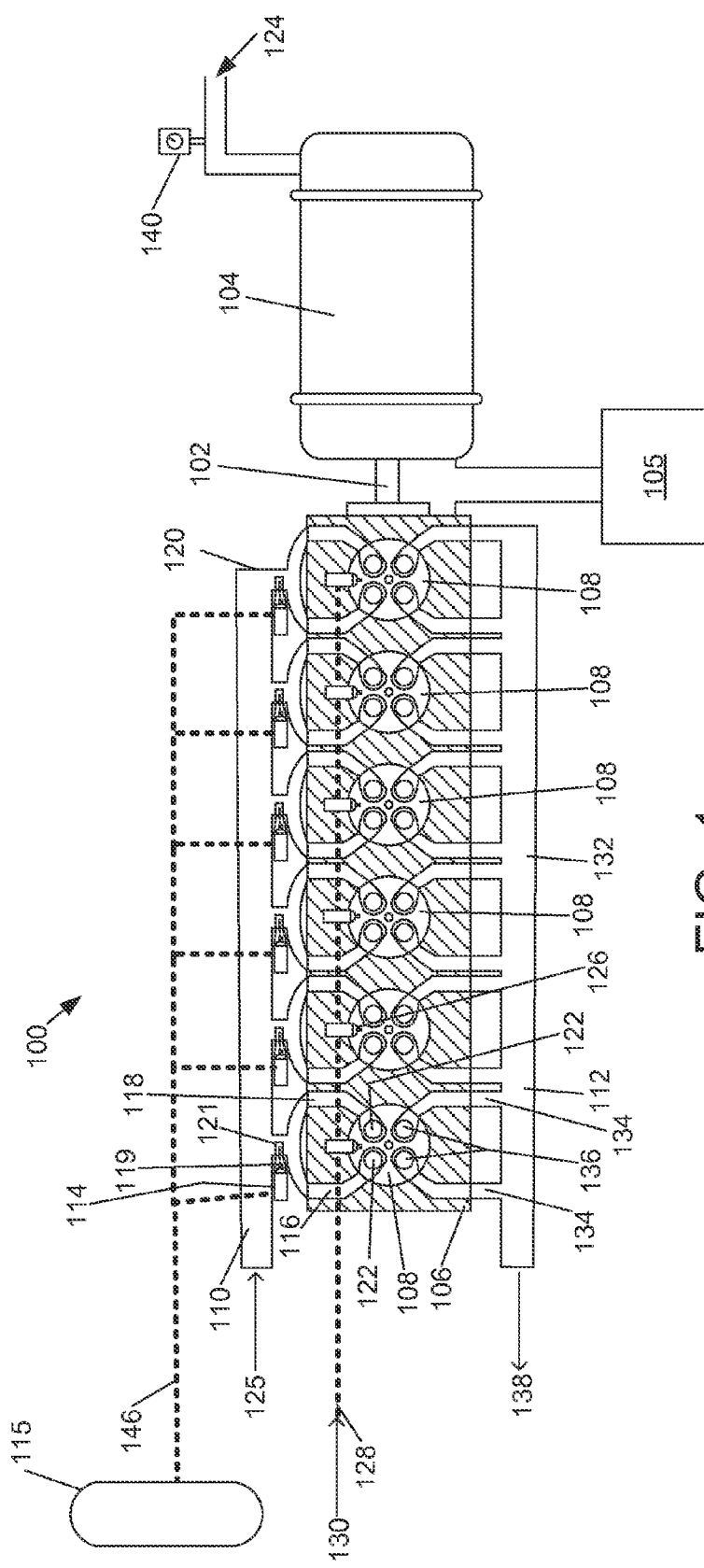
FIG. 1 is a block diagram of an internal combustion engine configured to operate using a gaseous fuel in accordance with the disclosure.

FIG. 1 is a block diagram representation of an internal combustion engine 100 in accordance with the disclosure.

As shown, the engine 100 is a stationary engine that is part of a generator set. Alternatively, the engine 100 may be part of a machine or off-highway truck and be connected to an electrical generator that is part of a hybrid-electric drive system, a fluid pump that is part of a hydrostatic drive system used on a stationary or mobile land or marine applications. The engine 100 has an output shaft 102 connected to a generator 104. During operation, the engine 100 may operate at a nearly constant engine speed but at a varying load depending on the electrical power or current output of the generator 104. A controller 105 may be operably associated with various engine and/or generator systems. The controller 105 in the illustrated embodiment includes operable connections to various sensors and systems of the engine 100 and generator 104, and is configured to receive information on the operating parameters thereof as well as send commands to various actuators and systems through the connections.

The controller 105 may be a single controller or may include more than one controller disposed to control various functions and/or features of the system. For example, a master controller, used to control the overall operation and function of the generator set may be cooperatively implemented with an engine controller used to control the engine 100. In this embodiment, the term "controller" is meant to include one, two, or more controllers that may be associated with the engine 100 and that may cooperate in controlling various functions and operations of the engine 100 and generator 104. The functionality of the controller 105, while shown conceptually in FIG. 2 to include various discrete functions for illustrative purposes only, may be implemented in hardware and/or software without regard to the discrete functionality shown. Accordingly, various interfaces of the controller are described relative to components of the generator set shown in the block diagram of FIG. 1. Such interfaces are not intended to limit the type and number of components that are connected, nor the number of controllers that are described.

Accordingly, the controller 105 in the illustrated embodiment is configured to receive information indicative of various operating parameters of the engine 100 and to control various operating parameters of the engine 100, such as fuel injection timing, allowable or desired fuel substitution rates depending on the operating point of the engine 100, and others. The engine 100 may include various components and systems, such as lubrication and electrical systems, which have been omitted from FIG. 1 for simplicity. Relevant to the present disclosure, the engine 100 includes a cylinder case 106 having one or more cylinders 108, which can also be referred to as combustion cylinders, formed therein. Although six cylinders 108 are shown in an inline configuration, any other number of cylinders arranged in different configurations, such as a "V" configuration, may be used.

Each cylinder 108 includes a reciprocable piston defining a combustion chamber that is connectable to an intake manifold 110 and an exhaust manifold 112. In the illustrated, exemplary embodiment, each cylinder 108 includes a spark initiator device or spark plug 126. The spark plugs 126 are connected to a voltage source 128 that can selectively activate each spark plug 126 according to a desired ignition timing and sequence 130 during engine operation provided by the controller 105 during engine operation. For example, the controller 105 may be configured to receive timing information from the engine 100, which is used to determine the appropriate ignition timing for each combustion cylinder 108.

The engine 100 further includes a fuel injector 114 disposed to inject a predetermined amount of fuel into an intake runner 116 and/or intake runner 118 for each combustion cylinder 108. In this way, a fuel injector 114 is mounted adjacent to and corresponds to each combustion cylinder 108. In an alternative embodiment, a single fuel injector 114 may be mounted to inject fuel into the intake manifold 110, which may then distribute the fuel into the individual combustion cylinders 108. In the illustrated embodiment, the fuel injector 114 is a gas fuel injector that is operably connected to a supply of gaseous fuel or reservoir 115, which may be a tank reservoir or may alternatively be a pressure regulated supply from a field source, such as biogas from a land fill, natural gas from an oil well and the like. The fuel delivered by the fuel injector mixes with incoming air 125 to form an air/fuel mixture that is admitted into the cylinders 108 via intake valves 122.

To promote sufficient fuel mixing, a fuel conduit 119 is connected between the fuel injector 114 and a gas diffuser 121, which is disposed within the intake runner 116 and/or 118 of each combustion cylinder 108. During operation, an air/fuel mixture from the intake manifold 110 is admitted into each cylinder 108. Gas fuel is injected into each cylinder 108 at the appropriate time and duration during engine operation to provide a richer air/fuel mixture than what is already present in the cylinder 108. Compression of this mixture within the cylinder 108 and a spark provided by the spark plug 126 causes ignition of the mixture found therein, which initiates combustion of all combustible fuels found the in the cylinder, if more than one fuel is present. Each cylinder 108 is configured to selectively receive air from the intake manifold 110, which may be at or below atmospheric pressure for a naturally aspirated engine, or may alternatively be under positive gage pressure in a turbocharged or supercharged engine. In the illustrated embodiment, the engine 100 may further include a turbocharger (not shown) that is fluidly connected in the known configuration between the intake manifold 110 and exhaust manifold 112.

During operation, air from the intake manifold 110 is provided to each cylinder 108 via, respectively, the first intake runner 116 and second intake runner 118. The first intake runner 116 and the second intake runner 118 of each cylinder 108 may be directly connected to an intake plenum volume 120 of the intake manifold 110 or may alternatively be branches of a combined intake port (not shown) that is fluidly open to the intake plenum volume 120. A first intake valve 122 is disposed to fluidly isolate the cylinder 108 from the first intake runner 116, and a second intake valve 122 is similarly disposed to fluidly isolate the cylinder 108 from the second intake runner 118. When the intake valves 122 are closed, such as during combustion of the air/fuel mixture in the cylinder 108, fluid communication between each respective cylinder 108 and the intake manifold 110 is blocked. Similarly, at least partial opening of either the first and/or second intake valve(s) 122 permits the fluid communication of the cylinder 108 with the intake plenum volume 120 such that air 125 and fuel may enter the cylinder 108. The combustion of the air/fuel mixture in the cylinder 108 produces power, which is transferred as torque to the output shaft 102 to drive the generator 104. The generator 104 is configured to provide electrical power through an output node 124. Although two leads are shown in the output node 124, any other appropriate arrangement for electrical power production and distribution, such as multiphase outputs having more than two leads are contemplated.

Exhaust gas remaining after the combustion of fuel with air from the intake valves 122 within each cylinder 108 is evacuated and collected in the exhaust manifold 112. In the illustrated embodiment, each cylinder 108 is fluidly connectable to an exhaust plenum volume 132 via two exhaust ports 134. Each exhaust port 134 is fluidly isolatable from the cylinder 108 by a corresponding exhaust valve 136. The exhaust gas 138 collected is removed from the exhaust manifold 112. Although two exhaust valves 136 are shown corresponding to each cylinder 108, a single exhaust valve disposed in a single exhaust port per cylinder 108 may be used.

Figure 2:
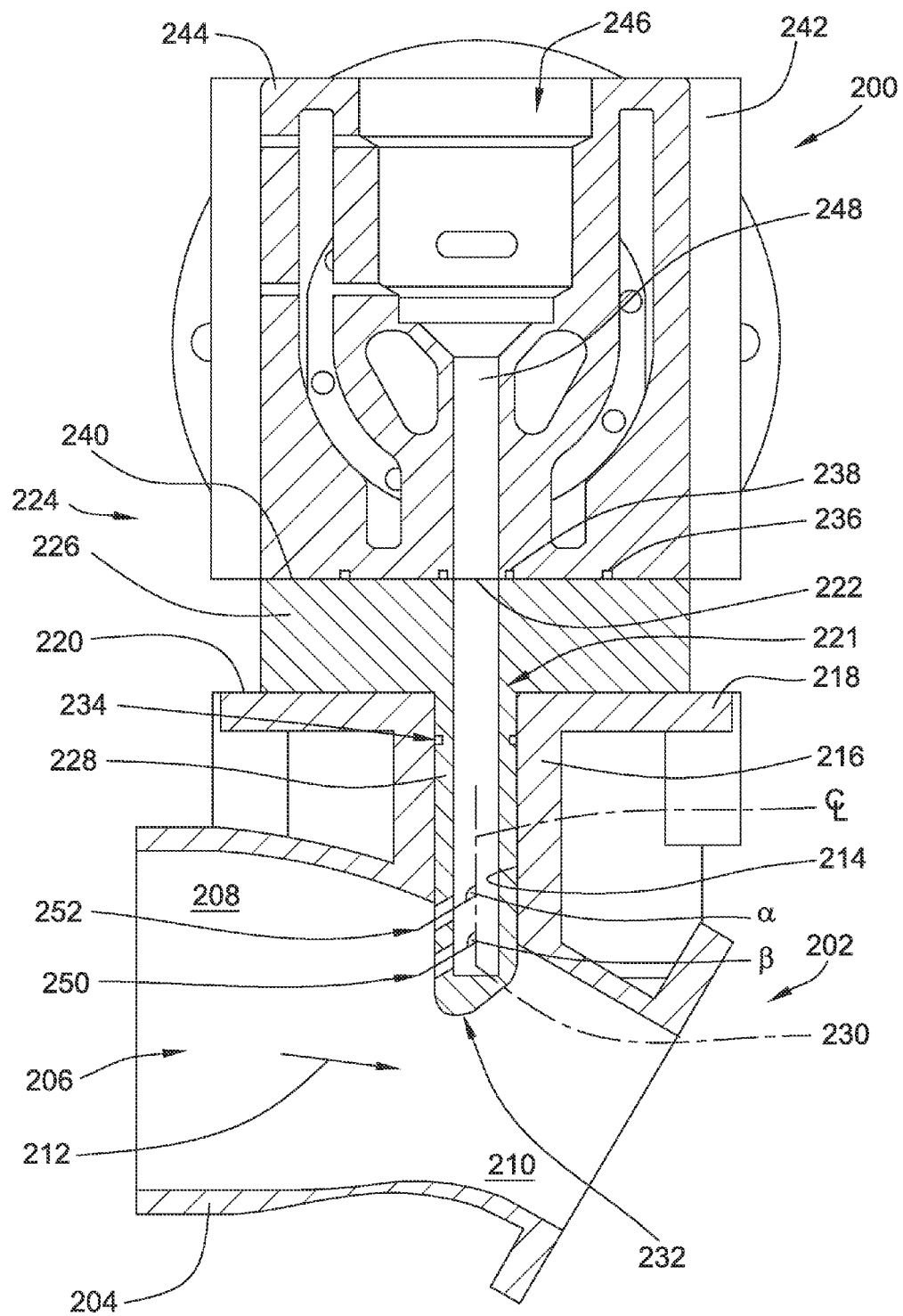
FIG. 2 is a fragmentary view of one embodiment for a structure for introducing gas into an engine in accordance with the disclosure.

A fragmentary view of a one embodiment for a gas mixing or diffusion structure 200 is shown in FIG. 2. In this figure, an intake runner segment 202 of an engine is shown. The intake runner segment 202 may be disposed between an intake manifold of the engine, for example, the intake manifold 110, and a combustion cylinder, for example, the combustion cylinder 108, as shown in FIG. 1. The intake runner segment 202 forms an outer wall 204 that surrounds and defines a fluid passage 206 having an upstream side 208 and a downstream side 210 with respect to a flow direction 212 of air passing from the intake manifold of the engine, through the fluid passage 206 and into the combustion cylinder of the engine. For connecting a fuel injector to the intake runner segment 202, the outer wall 204 forms a bore 214 surrounded by a standoff 216 that terminates in a mounting flange 218. The mounting flange 218 presents a flat face 220 that surrounds a mouth opening 221 of the bore 214.

A gas diffuser 224 is connected to the intake runner segment 202. The gas diffuser 224 includes a body portion 226, a gas injector portion 228 and a gas injection passage 230 that extends through the body portion 226 and the gas injector portion 228. The gas diffuser 224 is sealably and releasably attached to the intake runner segment 202 such that the gas injector portion 228 protrudes within the fluid passage 206. In the illustrated embodiment, the body portion 226, which has a generally cylindrical shape, is releasably attached to the mounting flange 218. The gas injector portion 228, which has a generally elongate tubular shape, is disposed within the bore 214. As shown, the gas injector portion 228 is longer than the bore 214 such that a gas injector tip 232 protrudes into the fluid passage 206. A seal 234, for example, a radial seal such as an O-ring, is disposed along the cylindrical interface between the gas injector portion 228 and the bore 214 to prevent entry of water and/or debris into the fluid passage 206 from the environment when the engine is off, and leakage of air and/or gas from the fluid passage 206 to the environment when the engine is operating. Two additional seals 236 and 238 are disposed on a top face 240 of the body portion 226.

An injector housing 242, which houses a gas injector such as the injector 114 (FIG. 1) is sealably and releasably attached to the top face 240 of the body portion 226. The injector housing 242 may include features and structures that are arranged and configured to house therein a gas injector and may differ than those shown in FIG. 2. In the illustrated embodiment, the injector housing 242 includes a body 244 that forms a receptacle 246 for receiving therein a gas injector. The receptacle 246 is fluidly open to a gas bore 248 that is connected to and forms an extension of the gas injection passage 230 formed in the gas diffuser 224. The gas bore 248 and gas injection passage 230 meet along an interface 222, which is sealed by the seals 238 and 238. It is noted that for certain applications, for example, marine applications, redundant sealing is required, for example, use of both seals 236 and 238, which are concentrically disposed around the interface 222 to provide two stages of sealing against gas leakage.

In the gas diffuser 224 shown in FIG. 2, a gaseous fuel from the injector disposed within the receptacle 246 may be injected during operation and provided to the gas bore 248 under sufficient pressure to cause the gaseous fuel to travel along the gas bore 248 while the engine is operating and air is passing through the fluid passage 206 from the intake manifold to the combustion cylinder. The gaseous fuel may follow the gas bore 248 and enter the gas injection passage 230, from where the gaseous fuel may be injected into the fluid passage 206 and mix with the air passing therethrough. To access the fluid passage 206 form the gas injection passage 230, one or more flow orifices are provided in the gas injector tip 232 that extend through the wall of the gas injector portion 228 and fluidly connect the gas injection passage 230 with the fluid passage 206.

The size, shape, arrangement, orientation and the number of such fluid openings can determine not only the pressure drop of gas passing therethrough, but also the quantity and dispersion of the gaseous fuel within the air flow. Such parameters are important to ensure proper gas distribution and are also selectable for each particular application based on many parameters including air flow, air pressure, gas flow, gas pressure, the shape, length and other physical characteristics of the fluid passage, and the like. In the illustrated embodiment, the gas injector tip 232 forms a first orifice 250 and a second orifice 252, each of which having a generally circular cross section at a diameter of about 9 mm. The first orifice 250 has a centerline that forms a first, obtuse angle, $\alpha$, and the second orifice 252 forms a second, obtuse angle, $\beta$, with respect to a centerline, C/L, of the gas injection passage 230, but other arrangements can be used.

Figure 3:
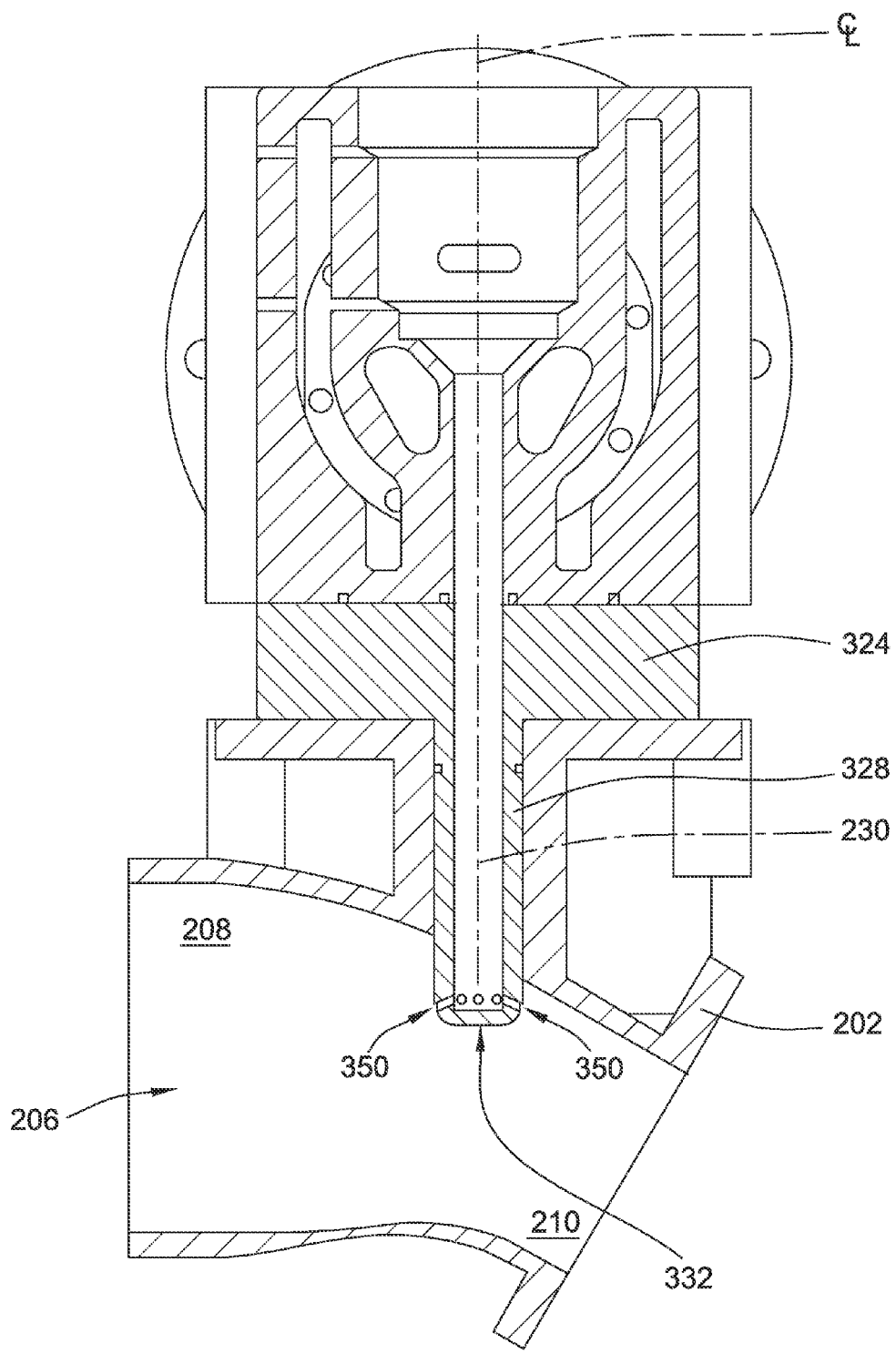
FIG. 3 is a fragmentary view of another embodiment for a structure for introducing gas into an engine in accordance with the disclosure.

An alternative embodiment of a gas diffuser 324 is shown in FIG. 3. In this embodiment, structures and features that are the same or similar to corresponding structures and features previously described or shown herein are denoted by the same reference as previously used for simplicity. Accordingly, the gas diffuser 324 includes a body portion 226 and a gas injector portion 328, which together form a gas injection passage 230 that extends therethrough. A plurality of nozzle openings 350 is formed at the gas injector tip 332. Unlike the gas diffuser 224, the nozzle openings 350 are formed peripherally around the centerline, C/L, of the gas injection passage such that they point both towards the upstream end 208 and also the downstream end 210 of the fluid passage 206. In the illustrated embodiment, eight nozzle openings are shown, each at a corresponding angle with respect to the centerline, C. Each of the eight nozzle openings 350 has a generally circular cross section at a diameter of about 4.5 mm.

It should be appreciated that the different nozzle configurations between the gas diffuser 224 and the gas diffuser 324 is independent of the common mounting arrangement and common structural interfaces with surrounding engine components such as the intake runner segment 202 and injector housing 242. In other words, depending on the engine application that may be used, a different gas diffuser may be used while surrounding engine components can remain the same, as can be seen, for example, by comparing the embodiments shown in FIGS. 2 and 3. Such arrangements also eliminate intermediate parts, connections, hoses and the like to increase design robustness and reduce the number of interfaces that may be prone to leakage.

INDUSTRIAL APPLICABILITY

This disclosure generally relates to engines and, particularly, to engines using a gaseous fuel as a primary fuel source or, at least, one of the engine's fuel sources. It has been determined that gaseous fuel is best introduced in the an engine's intake system such that it is properly and sufficiently diffused for most efficient combustion. The method with which gaseous fuel is introduced into the engine must change depending on the particular requirements and structures of each particular type or model of engine. By use of the structures and methods described in the present disclosure, an intermediate piece, which inserts into the intake runner and is attached to an injector valve body is used. The intermediate piece is advantageously interchangeable with other pieces and entirely contains gas diffusion features such that a change in the intermediate piece can change the gas diffusion characteristics, and thus the efficiency, of each engine application. The term "engine application," as used herein, from a general perspective, is meant to encompass not only the context of use of an engine on land, sea, mobile or stationary applications, but also the engine structure and the use of the same or similar engine structures in different applications requiring different performance characteristics such as engine peak torque, rated speed, and the like. From a more narrow perspective, the term "engine application" encompasses engines having the same or similar structures surrounding a gas diffuser, into which interchangeably different diffusers can be used to optimize gas distribution into engine or cylinder intake air.

Figure 4:
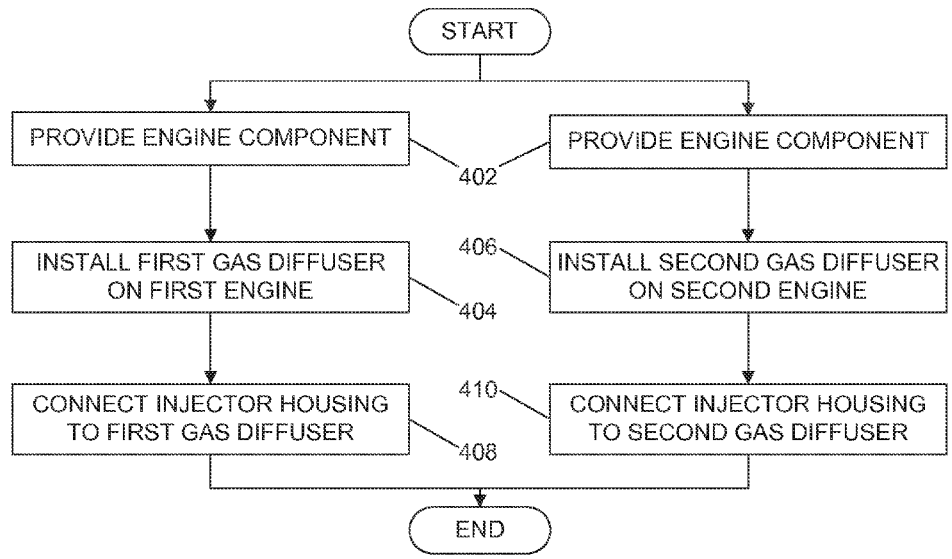
FIG. 4 is a flowchart for a method of assembling an engine.

Accordingly, a method for assembling a first engine and a second engine is shown in the flowchart of FIG. 4. The method includes providing an engine component that forms at least a portion of a fluid passage that carries intake air to one or more engine cylinders at 402. The engine component is common to the first and second engines. An interchangeable gas diffuser that corresponds to the particular engine is selected and attached to the engine component such that a gas orifice is disposed to inject has into the fluid passage. Specifically, a first gas diffuser having a first gas injection pattern is installed onto the engine component of the first engine at 404. A second gas diffuser having a second gas injection pattern is installed on the engine component of the second engine at 406. A housing that contains a gaseous fuel injector is connected to the first gas diffuser at 408, and an identical housing containing a gaseous fuel injector is connected to the second gas diffuser at 410.

Figure 5:
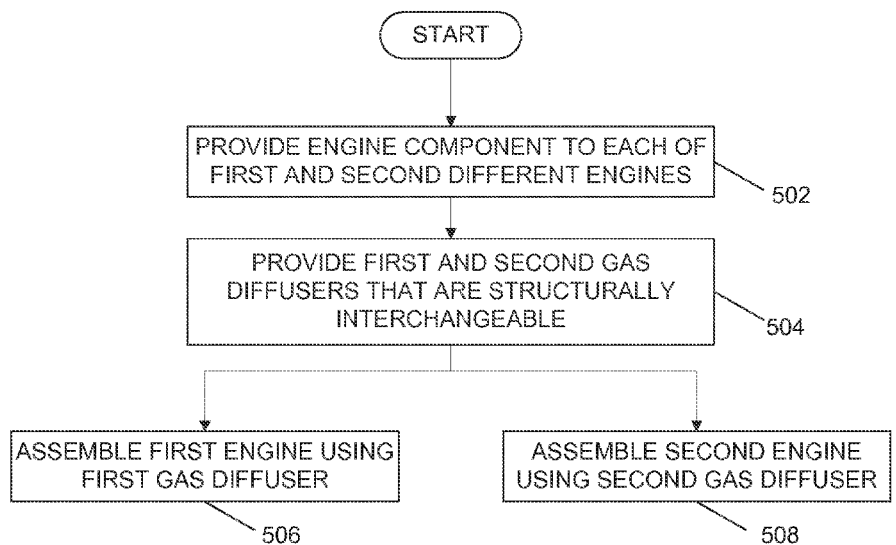
FIG. 5 is a flowchart for a method of using common engine parts in first and second different engines having different gas dispersion requirements.

A flowchart for a method of using common engine parts in first and second different engines having different gas dispersion requirements is shown in FIG. 5. The method includes providing an engine component forming at least a portion of an intake air passage for each of the first and second different engines at 502, and providing first and second gas diffuser components that are structurally interchangeable but include different gas spray patterns at 504. The first and second engines are assembled by connecting the first gas diffuser to the first engine at 506, and the second gas diffuser to the second engine at 508.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. An internal combustion engine, comprising:
    a combustion cylinder defined at least partially within a cylinder block, the combustion cylinder configured to receive air during operation through an intake air fluid passage;
    an engine component that at least partially forms a section of the intake air fluid passage, wherein the engine component is an intake runner disposed between an intake manifold of the engine and a cylinder head of the engine, wherein the intake runner forms a bore that is fluidly connected to an inner portion thereof that forms the section of the intake air fluid passage, and a mounting flange, which surrounds the bore and presents a flat surface, wherein the body portion is disposed onto the mounting flange, and wherein the gas injector portion has an elongate shape that extends through the bore in the intake runner;
    a radial seal disposed between the bore and the gas injector portion;
    a gas diffuser that includes a body portion and a gas injector portion, the body portion being connected to a mounting flange formed on the engine component, and the gas injector portion extending through a bore formed in the engine component such that a tip of the gas injector portion is disposed within the intake air fluid passage, the gas diffuser forming a gas injection passage, which extends through the body portion and the gas injector portion, and at least one gas injection orifice, which fluidly connects the gas injection passage with the intake air fluid passage;
    a gas injector housing connected to the body portion of the gas diffuser, the gas injector housing having a gas outlet that is fluidly connected to the gas injection passage.

2. The internal combustion engine of claim 1, wherein the gas injector housing includes a gas injector valve sealably disposed within a receptacle formed in the gas injector housing.

3. The internal combustion engine of claim 1, wherein the engine component is an intake manifold.

4. The internal combustion engine of claim 1, wherein a first seal is disposed between the mounting flange and the body portion.

5. The internal combustion engine of claim 4, wherein a second seal is disposed between the mounting flange and the body portion.

* * * * *